US010096167B2

(12) United States Patent
Moravetz

(10) Patent No.: US 10,096,167 B2
(45) Date of Patent: *Oct. 9, 2018

(54) METHOD FOR EXECUTING FUNCTIONS IN A VR ENVIRONMENT

(71) Applicant: SONY INTERACTIVE ENTERTAINMENT AMERICA LLC, San Mateo, CA (US)

(72) Inventor: Justin Moravetz, Foster City, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/813,032

(22) Filed: Nov. 14, 2017

(65) Prior Publication Data
US 2018/0082483 A1    Mar. 22, 2018

Related U.S. Application Data

(63) Continuation of application No. 15/239,382, filed on Aug. 17, 2016, now Pat. No. 9,818,230, which is a
(Continued)

(51) Int. Cl.
*G06T 19/00* (2011.01)
*G09G 5/00* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
CPC .. G06T 19/006; G09G 5/006; G09G 2320/08; G09G 3/003; G09G 2320/0693;
(Continued)

(56) References Cited

U.S. PATENT DOCUMENTS 5,258,785 A    11/1993  Dawkins
5,585,871 A    12/1996  Linden
(Continued)

FOREIGN PATENT DOCUMENTS

EP    1 679 577     7/2006
EP    2 378 781     10/2011
(Continued)

OTHER PUBLICATIONS

Hollerer, T., et al., "User interface management techniques for collaborative mobile augmented reality", Computers and Graphics, 25(5):799-810, Dec. 2001.*
(Continued)

*Primary Examiner* — Robert Craddock
(74) *Attorney, Agent, or Firm* — Polsinelli LLP

(57) ABSTRACT

A wearable computing device includes a head-mounted display (HMD) that generates a virtual reality environment. Through the generation and tracking of positional data, the virtual environment may be interrupted or paused. Upon pausing the environment, a user may access a number of ancillary menus and controls not otherwise available during normal operation of the virtual environment.

19 Claims, 5 Drawing Sheets

Related U.S. Application Data continuation of application No. 14/283,083, filed on May 20, 2014, now Pat. No. 9,437,159.

(60) Provisional application No. 61/931,583, filed on Jan. 25, 2014.

(51) Int. Cl.
*G02B 27/01* (2006.01)
*G02B 27/00* (2006.01)
*G09G 3/00* (2006.01)
*G06F 3/01* (2006.01)
*G06T 7/70* (2017.01)

(52) U.S. Cl.
CPC .......... *G02B 27/0179* (2013.01); *G06F 3/011* (2013.01); *G06F 3/012* (2013.01); *G06F 3/017* (2013.01); *G06T 7/70* (2017.01); *G09G 3/003* (2013.01); *G09G 3/006* (2013.01); *G09G 5/006* (2013.01); *G02B 2027/014* (2013.01); *G02B 2027/0187* (2013.01); *G09G 2320/0693* (2013.01); *G09G 2320/08* (2013.01); *G09G 2354/00* (2013.01); *G09G 2370/10* (2013.01); *G09G 2370/12* (2013.01)

(58) Field of Classification Search
CPC ........... G09G 2370/10; G09G 2370/12; G09G 2354/00; G02B 27/017; G02B 27/0093; G02B 2027/0187; G02B 27/0179
See application file for complete search history.

(56) References Cited

U.S. PATENT DOCUMENTS

| | | | |
|---|---|---|---|
| 5,757,358 | A | 5/1998 | Osga |
| 5,982,555 | A | 11/1999 | Melville et al. |
| 6,084,979 | A | 7/2000 | Kanade et al. |
| 6,151,060 | A | 11/2000 | Tabata |
| 6,152,563 | A | 11/2000 | Hutchinson et al. |
| 6,175,352 | B1 | 1/2001 | Kay et al. |
| 6,184,847 | B1 | 2/2001 | Fateh et al. |
| 6,282,362 | B1 | 8/2001 | Murphy et al. |
| 6,315,273 | B1 | 11/2001 | Davies |
| 7,298,378 | B1 | 11/2007 | Hagenbuch et al. |
| 7,933,395 | B1 | 4/2011 | Bailly et al. |
| 7,949,642 | B2 | 5/2011 | Yang et al. |
| 7,970,240 | B1 | 6/2011 | Chao et al. |
| 8,803,912 | B1 | 8/2014 | Fouts |
| 9,043,325 | B1 | 5/2015 | Moczydlowski |
| 9,254,438 | B2 | 2/2016 | Finn et al. |
| 9,256,347 | B2 | 2/2016 | Finn et al. |
| 9,318,026 | B2 | 4/2016 | Peters et al. |
| 9,437,159 | B2 | 9/2016 | Moravetz |
| 9,472,014 | B2 | 10/2016 | Chan et al. |
| 9,521,368 | B1 | 12/2016 | Cronin |
| 9,588,343 | B2 | 3/2017 | Cronin |
| 9,818,230 | B2 | 11/2017 | Moravetz |
| 9,838,506 | B1 | 12/2017 | Cronin |
| 9,986,207 | B2 | 5/2018 | Cronin |
| 2002/0038456 | A1 | 3/2002 | Hansen et al. |
| 2004/0193441 | A1 | 9/2004 | Altieri |
| 2006/0028400 | A1 | 2/2006 | Lapstun et al. |
| 2006/0242680 | A1 | 10/2006 | Johnson et al. |
| 2008/0024392 | A1 | 1/2008 | Gustafsson et al. |
| 2008/0221843 | A1 | 9/2008 | Shenkar et al. |
| 2009/0005961 | A1 | 1/2009 | Grabowski et al. |
| 2009/0106672 | A1 | 4/2009 | Burstrom |
| 2009/0271436 | A1 | 10/2009 | Reisinger |
| 2010/0017728 | A1 | 1/2010 | Cho et al. |
| 2010/0083169 | A1 | 4/2010 | Athsani et al. |
| 2010/0088632 | A1 | 4/2010 | Knowles et al. |
| 2010/0102476 | A1 | 4/2010 | Higgins |
| 2010/0231706 | A1 | 9/2010 | Maguire |
| 2010/0238161 | A1 | 9/2010 | Varga et al. |
| 2010/0259471 | A1 | 10/2010 | Takano et al. |
| 2011/0043530 | A1* | 2/2011 | Nozuki ............... G09G 5/003 345/522 |
| 2011/0087350 | A1 | 4/2011 | Fogel et al. |
| 2011/0214071 | A1 | 9/2011 | Zyda et al. |
| 2011/0219291 | A1 | 9/2011 | Lisa |
| 2011/0267419 | A1 | 11/2011 | Quinn et al. |
| 2011/0301760 | A1 | 12/2011 | Shuster et al. |
| 2011/0313779 | A1 | 12/2011 | Herzog et al. |
| 2012/0086727 | A1 | 4/2012 | Korah et al. |
| 2012/0154277 | A1 | 6/2012 | Bar-zeev et al. |
| 2012/0154557 | A1 | 6/2012 | Perez et al. |
| 2012/0249741 | A1 | 10/2012 | Maciocci et al. |
| 2012/0289147 | A1 | 11/2012 | Raleigh et al. |
| 2012/0311043 | A1 | 12/2012 | Chen et al. |
| 2013/0007668 | A1 | 1/2013 | Liu et al. |
| 2013/0021373 | A1 | 1/2013 | Vaught et al. |
| 2013/0057550 | A1 | 3/2013 | Kishikawa et al. |
| 2013/0069787 | A1 | 3/2013 | Petrou |
| 2013/0083009 | A1 | 4/2013 | Geisner et al. |
| 2013/0083063 | A1 | 4/2013 | Geisner et al. |
| 2013/0106674 | A1 | 5/2013 | Wheeler et al. |
| 2013/0120224 | A1 | 5/2013 | Cajigas et al. |
| 2013/0182891 | A1 | 7/2013 | Ling |
| 2013/0191178 | A1 | 7/2013 | Thompson et al. |
| 2013/0226528 | A1 | 8/2013 | Hodgins et al. |
| 2013/0227017 | A1 | 8/2013 | Gahlings |
| 2013/0246967 | A1 | 9/2013 | Wheeler et al. |
| 2013/0263016 | A1 | 10/2013 | Lehtiniemi et al. |
| 2013/0278531 | A1 | 10/2013 | Pisaris-Henderson |
| 2013/0321265 | A1 | 12/2013 | Bychkov et al. |
| 2013/0335303 | A1 | 12/2013 | Maciocci et al. |
| 2013/0335447 | A1 | 12/2013 | Lu et al. |
| 2013/0336629 | A1 | 12/2013 | Mulholland et al. |
| 2014/0063054 | A1* | 3/2014 | Osterhout ............... G06F 3/005 345/633 |
| 2014/0063055 | A1 | 3/2014 | Osterhout et al. |
| 2014/0164921 | A1 | 6/2014 | Salinas |
| 2014/0172906 | A1 | 6/2014 | Sud et al. |
| 2014/0229850 | A1 | 8/2014 | Makofsky et al. |
| 2014/0267581 | A1 | 9/2014 | Cronin |
| 2014/0280502 | A1 | 9/2014 | Cronin |
| 2014/0280503 | A1 | 9/2014 | Cronin |
| 2014/0280504 | A1 | 9/2014 | Cronin |
| 2014/0280505 | A1 | 9/2014 | Cronin |
| 2014/0280506 | A1 | 9/2014 | Cronin |
| 2014/0280644 | A1 | 9/2014 | Cronin |
| 2014/0282113 | A1 | 9/2014 | Cronin |
| 2015/0212322 | A1 | 7/2015 | Moravetz |
| 2015/0213778 | A1 | 7/2015 | Moravetz |
| 2017/0004654 | A1 | 1/2017 | Moravetz |
| 2017/0090460 | A1 | 3/2017 | Andrew et al. |
| 2017/0150103 | A1 | 5/2017 | Cronin |
| 2017/0242479 | A1 | 8/2017 | Cronin |
| 2018/0097915 | A1 | 4/2018 | Cronin |

FOREIGN PATENT DOCUMENTS

| | | |
|---|---|---|
| JP | H10-222287 | 8/1998 |
| JP | H11-095971 | 4/1999 |
| JP | 2003-280805 | 10/2003 |
| JP | 2011-228859 | 11/2011 |
| JP | 2013-168910 | 8/2013 |
| JP | 2013-258614 | 12/2013 |
| RU | 111703 | 12/2011 |
| WO | WO 2013/138607 | 9/2013 |
| WO | WO 2015/112359 | 7/2015 |
| WO | WO 2015/112361 | 7/2015 |

OTHER PUBLICATIONS

A Quality of Experience Model for Haptic Virtual Environments; Hamam et al., ACM Transaction on Multimedia Computing, Communications and Applications, vol. 10, No. 3, Article 28, pp. 1-23, Apr. 2014.

European Patent Application 15740676.0 Extended European Search Report dated Jul. 6, 2017.

(56) References Cited

OTHER PUBLICATIONS

Japanese Patent Application 2016-546976 Decision for Refusal dated Jul. 18, 2017.
Japanese Patent Application 2016-546976 Notification of Reason(s) for Refusal dated Feb. 7, 2017.
Japanese Patent Application 2016-548227 Notification of Reason(s) for Refusal dated Jul. 18, 2017.
PCT Application No. PCT/US2015/010990 International Search Report and Written Opinion dated May 11, 2015.
PCT Application No. PCT/US2015/010994 International Search Report and Written Opinion dated May 1, 2015.
U.S. Appl. No. 14/283,082 Office Action dated Jul. 1, 2016.
U.S. Appl. No. 14/283,083 Office Action dated Sep. 30, 2015.
U.S. Appl. No. 15/239,382 Office Action dated Mar. 9, 2017.
U.S. Appl. No. 14/460,272 Office Action dated Jul. 5, 2017.
U.S. Appl. No. 14/460,272 Office Action dated Aug. 3, 2016.
U.S. Appl. No. 14/460,272 Office Action dated Jan. 14, 2016.
U.S. Appl. No. 14/460,273 Final Office Action dated Nov. 2, 2017.
U.S. Appl. No. 14/460,273 Office Action dated May 10, 2017.
U.S. Appl. No. 14/460,275 Final Office Action dated Nov. 8, 2017.
U.S. Appl. No. 14/460,275 Office Action dated Apr. 13, 2017.
U.S. Appl. No. 14/460,276 Final Office Action dated Nov. 9, 2017.
U.S. Appl. No. 14/460,276 Office Action dated Apr. 13, 2017.
U.S. Appl. No. 14/460,277 Office Action dated Sep. 1, 2016.
U.S. Appl. No. 14/460,279 Office Action dated Jun. 15, 2017.
U.S. Appl. No. 14/460,280 Final Office Action dated Nov. 9, 2017.
U.S. Appl. No. 14/460,280 Office Action dated Apr. 18, 2017.
U.S. Appl. No. 14/460,281 Final Office Action dated Feb. 29, 2016.
U.S. Appl. No. 14/460,281 Office Action dated Oct. 8, 2015.
U.S. Appl. No. 15/377,288 Office Action dated Aug. 29, 2017.
U.S. Appl. No. 14/460,272, John Cronin, Personal Digital Assistance and Virtual Reality, filed Aug. 14, 2014.
U.S. Appl. No. 14/460,273, John Cronin, Real Time Unified Communications Interaction of a Predefined Location in a Virtual Reality Location, filed Aug. 14, 2014.
U.S. Appl. No. 14/460,275, John Cronin, Crowd and Cloud Enabled Virtual Reality Distributed Location Network, filed Aug. 14, 2014.
U.S. Appl. No. 14/460,276, John Cronin, System and Methods for Effective Virtual Reality Visitor Interface, filed Aug. 14, 2014.
U.S. Appl. No. 14/460,279, John Cronin, Virtual Reality Interaction With 3D Printing, filed Aug. 14, 2014.
U.S. Appl. No. 14/460,280, John Cronin, Virtual Reality Enhanced Through Browser Connections, filed Aug. 14, 2014.
Chinese Patent Application 2015-80005815.1 First Office Action dated Oct. 30, 2017.
Russian Patent Application No. 2016134268 Office Action dated Oct. 18, 2017.
Russian Patent Application No. 2016134268 Search Report dated Sep. 25, 2017.
Russian Patent Application No. 2016134577 Office Action dated Aug. 18, 2017.
Russian Patent Application No. 2016134577 Search Report dated Aug. 18, 2017.
U.S. Appl. No. 14/460,272 Final Office Action dated Feb. 22, 2018.
U.S. Appl. No. 15/832,022, John Cronin, Virtual Reality Universe Representation Changes Viewing Based Upon Client Side Parameters, filed Dec. 5, 2017.
U.S. Appl. No. 14/460,279 Final Office Action dated Feb. 1, 2018.
U.S. Appl. No. 14/460,273 Office Action dated May 24, 2018.
U.S. Appl. No. 14/460,275 Office Action dated Aug. 6, 2018.
U.S. Appl. No. 14/460,276 Office Action dated May 8, 2018.
U.S. Appl. No. 14/460,280 Office Action dated Jun. 14, 2018.

\* cited by examiner

FIGURE 2
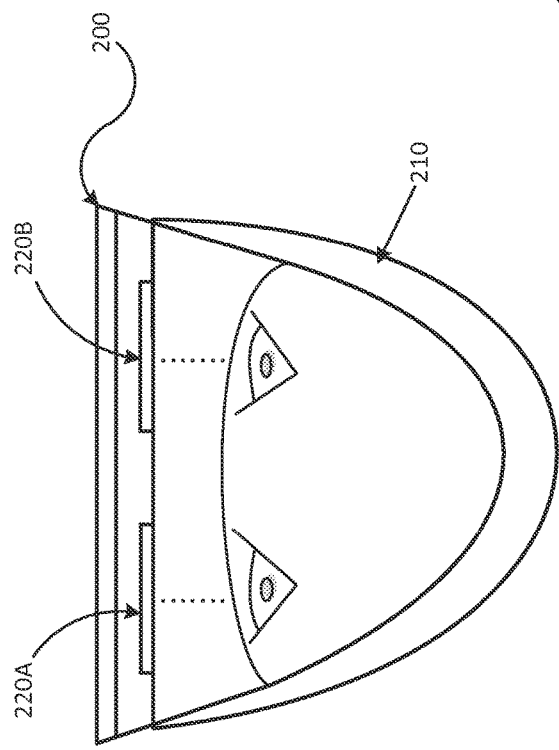
FIGURE 2A
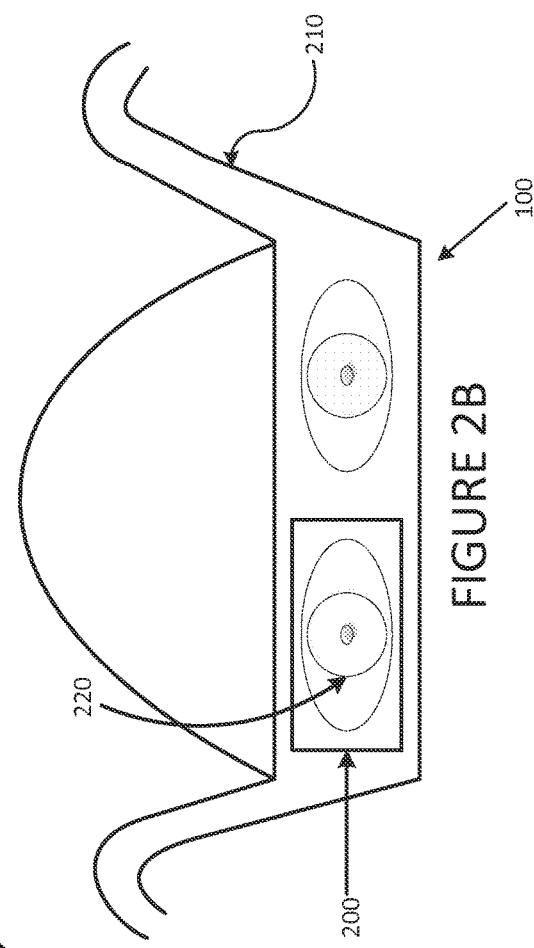
FIGURE 2B

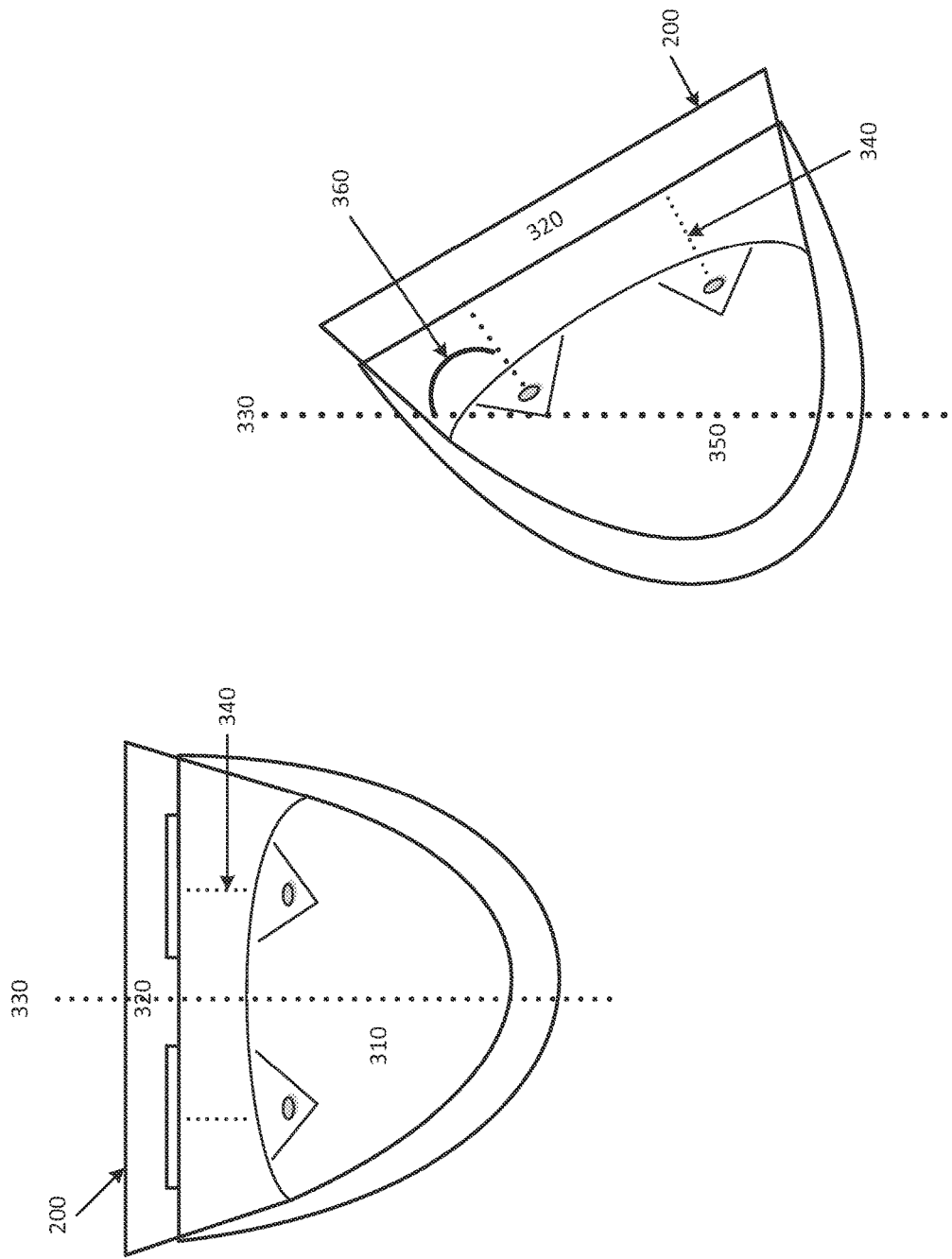

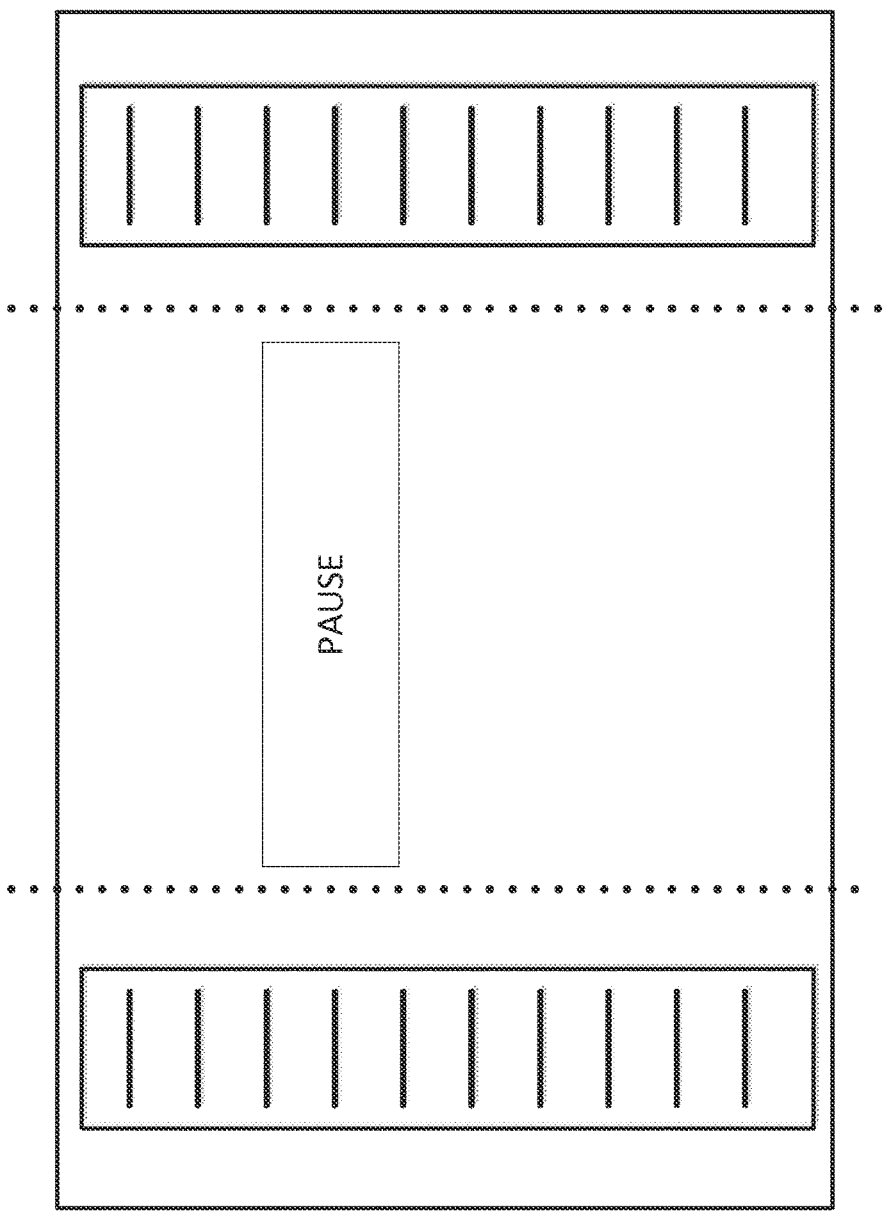

METHOD FOR EXECUTING FUNCTIONS IN A VR ENVIRONMENT

CROSS-REFERENCE TO RELATED APPLICATIONS

The present application is a continuation and claims the priority benefit of U.S. patent application Ser. No. 15/239,382 filed Aug. 17, 2016 issuing as U.S. Pat. No. 9,818,230, which is a continuation and claims the priority benefit of U.S. patent application Ser. No. 14/283,083 filed May 20, 2014 now U.S. Pat. No. 9,437,159, which claims the priority benefit of U.S. provisional patent application No. 61/931,583 filed Jan. 25, 2014, the disclosures of which are incorporated herein by reference.

BACKGROUND OF THE INVENTION

Field of Invention

The present invention generally relates to wearable virtual reality (VR) computing devices having a head-mounted display (HMD). More specifically, the present invention relates to interrupting operations in the field of view in the HMD and utilizing non field of view real estate in the HMD.

Description of the Related Art

Wearable VR systems integrate various elements, such as input devices, sensors, detectors, image displays, and wireless communication components, as well as image and audio processors. By placing an image display element close to the eyes of a wearer, an artificial image can be made to overlay the view of the real world or to create an independent reality all its own. Such image display elements are incorporated into systems also referred to as head-mounted displays (HMDs). Depending upon the size of the display element and the distance to the eyes of the wearer, artificial images provided on the display may fill or nearly fill the field of view of the wearer.

VR systems incorporating an HMD are mobile and lightweight, while allowing for communication and interaction with a virtual environment. Such systems are generally lacking, however, in that they still require use of an independent controller for navigation of the virtual environment. In this sense, most HMDs are little more than goggles allowing for entry into a VR environment. There is a need in the art for navigation and control of a VR environment without introducing an independent controller device, especially with respect to interrupting operations of the environment in a natural and non-intrusive manner. There is a further need to best utilize non-field of view "real estate" in that VR environment.

SUMMARY OF THE CLAIMED INVENTION

Embodiments of the present invention include systems and methods for interrupting a virtual environment in a head-mounted display. Information may be stored regarding at least one control setting that associates a function with a change in position of the head-mounted display. The head-mounted display may be calibrated to identify a start position. Positional data that tracks movement of the head-mounted display may be generated. A current position of the head-mounted display may be determined to be indicative of a change from the start position that exceeds the change in position of the control setting. Then, the function associated with the control setting may be executed, which may involve interrupting the virtual environment in the head-mounted display by pausing the environment.

A method for interrupting a virtual environment in a head-mounted display is claimed. Such methods may include storing information regarding at least one control setting that associates a function with a change in position of the head-mounted display, calibrating the head-mounted display to identify a start position, generating positional data that tracks movement of the head-mounted display, determining that a current position of the head-mounted display is indicative of a change from the start position that exceeds the change in position of the control setting, and executing the function associated with the control setting, wherein the function comprises interrupting the virtual environment in the head-mounted display by pausing the environment.

Further embodiments include system for interrupting a virtual environment in a head-mounted display. Such systems may include memory that stores information regarding at least one control setting that associates a function with a change in position of the head-mounted display, at least one of a gyroscope, magnetometer, and an accelerometer that calibrates the head-mounted display, wherein a start position of the head-mounted display is identified and generates positional data that tracks movement of the head-mounted display, a processor that executes instructions stored in memory to determine that a current position of the head-mounted display is indicative of a change from the start position that exceeds the change in position of the control setting and to execute the function associated with the control setting, and a head-mounted display including at least one lens to display the virtual environment where execution of the function interrupts the environment by pausing the environment.

Embodiments of the present invention may further include non-transitory computer-readable storage media, having embodied thereon a program executable by a processor to perform methods interrupting a virtual environment in a head-mounted display as described herein.

BRIEF DESCRIPTION OF THE DRAWINGS

FIG. 2A illustrates an HMD that completely immerses a wearer in a virtual reality environment.

FIG. 2B illustrates an HMD that allows for generation of VR information while maintaining perception of the real world.

FIG. 3 illustrates an exemplary implementation of an interrupt in the VR environment.

FIG. 5 illustrates the use of non-field-of-view real estate to provide information ancillary to the VR environment.

DETAILED DESCRIPTION

Embodiments of the present invention include systems and methods for interrupting a virtual environment in a head-mounted display. Information may be stored regarding at least one control setting that associates a function with a change in position of the head-mounted display. The head-mounted display may be calibrated to identify a start position. Positional data that tracks movement of the head-mounted display may be generated. A current position of the head-mounted display may be determined to be indicative of a change from the start position that exceeds the change in position of the control setting. Then, the function associated with the control setting may be executed, which may involve interrupting the virtual environment in the head-mounted display by pausing the environment.

Figure 1:
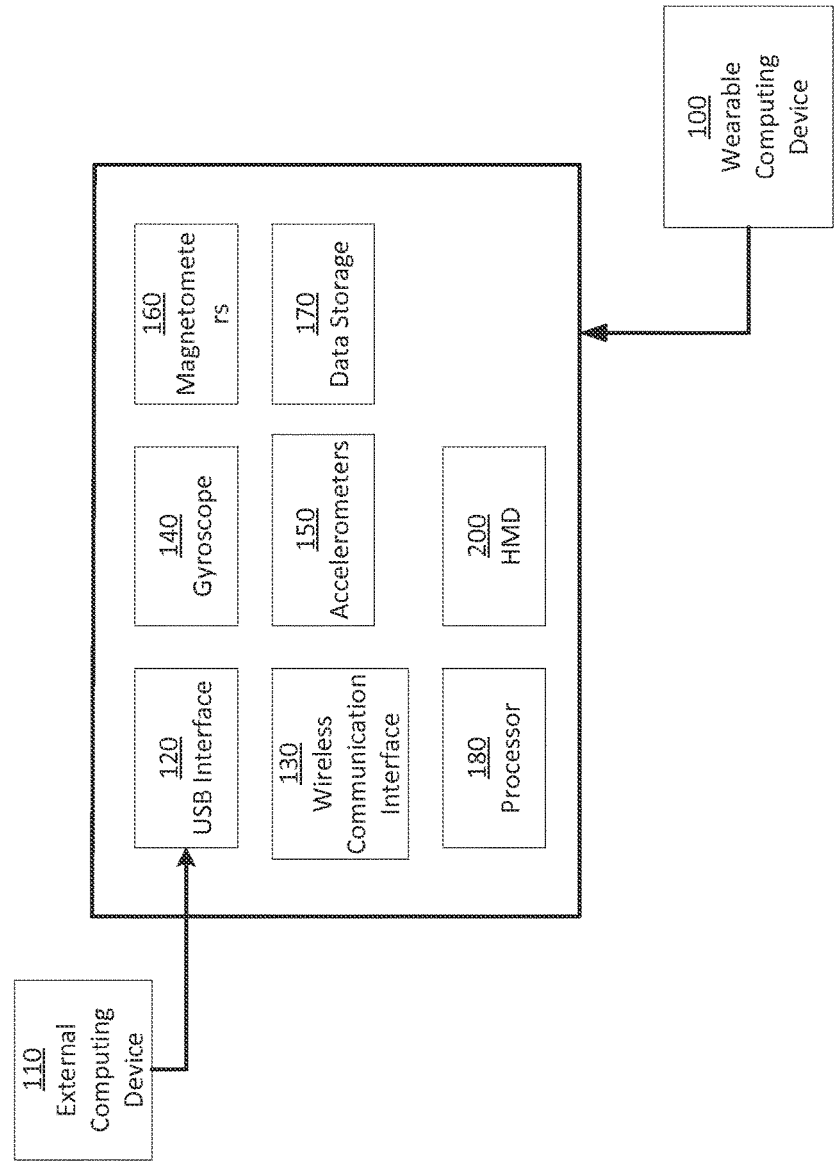
FIG. 1 illustrates a block diagram of an exemplary wearable computing device.

FIG. 1 illustrates a block diagram of an exemplary wearable virtual reality system 100. In communication with an external computing device 110, wearable virtual reality system 100 may include a USB interface 120, wireless communication interface 130, gyroscope 140, accelerometer 150, magnetometer 160, data storage 170, processor 180, and head-mounted display (HMD) 200.

Head-mounted display (HMD) 200 allows its wearer to observe real-world surroundings, a displayed computer generated image, or a combination of the two. HMD 200 may include a see-through display in some embodiments. The wearer of wearable co virtual reality system 100 may be able to look through HMD 200 in such an embodiment and observe a portion of the real-world environment notwithstanding the presence of the wearable virtual reality system 100. HMD 200 in a further embodiment may be operable to display images that are superimposed on the field of view to provide an "augmented reality" experience. Some of the images displayed by HMD 200 may be superimposed or appear in relation to particular objects in the field of view. In a still further embodiment, HMD 200 may be a completely virtual environment whereby the wearer of the wearable virtual reality system 100 is isolated from any visual contact with the real world.

The displayed image may include graphics, text, and/or video; audio may be provided through a corresponding audio device. The images displayed by the HMD may be part of an interactive user interface and include menus, selection boxes, navigation icons, or other user interface features that enable the wearer to invoke functions of the wearable computing device or otherwise interact with the wearable computing device. The form factor of HMD 200 may be that of eyeglasses, goggles, a helmet, a hat, a visor, a headband, or in some other form that can be supported on or from the head of the wearer.

To display a virtual image to the wearer, the HMD may include an optical system with a light source such as a light-emitting diode (LED) that illuminates a display panel. The display panel may encompass a liquid crystal display panel (LCD). The display panel may generate light patterns by spatially modulating the light from the light source, and an image former forms a virtual image from the light pattern. Alternatively, the panel may be liquid crystal on silicon (LCOS) whereby a liquid crystal layer may be situated on top of a silicon backplane.

The HMD in an exemplary embodiment includes a 7 inch screen with non-overlapping stereoscopic 3D images whereby the left eye sees extra area to the left and the right eye sees extra area to the right. The HMD attempts to mimic normal human vision, which is not 100% overlapping. The field of view in an exemplary embodiment is more than 90 degrees horizontal (110 degrees diagonal) thereby filling approximately the entire field of view of the view such that the real world may be completely blocked out to create a strong sense of immersion.

An embodiment may utilize 1280×800 (16:10 aspect ratio) thereby allowing for an effective of 640×800, 4:5 aspect ratio per eye. In an embodiment that does not allow for complete overlap between the eyes, the combined horizontal resolution is effectively greater than 640. The displayed image for each eye is pin cushioned thereby generating a spherical-mapped image for each eye.

HMD 200 may communicate with external computing device(s) 110. External computing device(s) 110 are inclusive of application servers, databases, and other external computing components known in the art, including standard hardware computing components such as network and media interfaces, non-transitory computer-readable storage (memory), and processors for executing instructions or accessing information that may be stored in memory.

Wearable virtual reality system 100 may in some instances be physically connected to external computing device(s) 110. Such a connection may be implemented by way of a USB interface 120, which may be used to send data to and receive data from an external computing device 110 by way of a USB-compliant cabling. USB interface 120 may also be used to power the wearable virtual reality system 100 thereby potentially negating the need for an external power supply and any power cabling associated with the same. In some instances, a further power adapter (not shown) may be necessary to implement power by way of the USB interface 120. It should be understand that reference to USB is exemplary as other types of interfaces may be used including but not limited to FireWire, Lightning, as well as other cabled connection standards such as HDMI and DVI.

Wearable virtual reality system 100 of FIG. 1 includes a wireless communication interface 130. Wireless communication interface 130 may be used for wirelessly communicating with external computing device(s) 110. Wireless communication interface 130 may also be used for communicating with other wearable computing devices 100. Wireless communication interface 130 may utilize any number of wireless communication standards that support bi-directional data exchange over a packet-based network such as the Internet. Exemplary communication standards include CDMA, GSM/GPRS, 4G cellular, WiMAX, LTE, and 802.11 (WiFi).

Wearable virtual reality system 100 may include one or more of three-dimensional axis gyroscopes 140, accelerometers 150, and magnetometers 160 Gyroscope 140 may be utilized to measure orientation based on the principles of angular momentum. Accelerometer 150 may be used to detect magnitude and direction of acceleration as a vector quantity. This result can be used to sense orientation because direction of weight changes, coordinate acceleration correlated to g-force or a change in g-force, and vibration, shock, and falling in a resistive medium by way of a change in proper acceleration. Magnetometers 160 may be used to identify disturbances in a magnetic field relative the wearable virtual reality system 100. Magnetometer 160 can assist in the identification of true north for GPS and compass applications as well as assist with touchless or camera-less gesture input. By utilizing data generated from the foregoing, absolute head orientation tracking without drift relative to the earth may be calculated. Latency tracking may operate at approximately 1000 Hz to decrease response time and increase perceived realism. The displays of wearable virtual reality system 100 may be adjusted to allow the individual displays to be moved further or closer to the eyes of the wearer.

Wearable virtual reality system 100 may operate by way of the execution of non-transitory computer readable instructions stored in data storage 170, where execution occurs through operation of processor 180. While FIG. 1 illustrates data storage 170 and processor 180 as being present at wearable virtual reality system 100, such elements may be located in external computing device(s) 110 or in some instances, with executable operations distributed between the two. Processor 180 and executable instructions at data storage 170 may also control various aspects of USB interface 120, wireless interface 130, gyroscopes 140, accelerometers 150, and magnetometers 160.

FIG. 2A illustrates an HMD 200 that completely immerses a wearer in a virtual reality environment. While FIG. 2A is illustrated as immersive goggles, other form factors are possible and envisioned. The operation of elements in FIG. 2A are the same as those discussed in the context of FIG. 2B. FIG. 2A includes head-mounted support 210 that allows for wearable virtual reality system 100 (including HMD 200) to be positioned on the head of a wearer. HMD 200 further includes lens displays 220A and 220B that may be of LCD or LCOS construction as described above. Lens displays 220A and 220B may be an integrated part of wearable virtual reality system 100.

The manufacture of wearable virtual reality system 100 may allow for integration of components like those illustrated in FIG. 1 and various component interconnects to be internally integrated. Other components may be situated on the exterior of wearable virtual reality system 100 to allow for more ready access or physical connections to external computing device(s) 110. An embodiment of wearable virtual reality system 100 may include a microphone to allow for voice communication with other individuals utilizing wearable virtual reality system 100 or to allow for certain hands free control of the system 100.

FIG. 2B illustrates an HMD 200 that allows for generation of virtual reality information while maintaining perception of the real world. Such dual perception is provided for by not completely immersing the wearer within the confines of the virtual environment (i.e., the real world can still be seen and perceived). While HMD 200 of FIG. 2B is illustrated as a simple band other form factors are possible and envisioned. The operation of elements on FIG. 2B are the same as those discussed in the context of FIG. 2A.

FIG. 3 illustrates an exemplary implementation of an interrupt in the VR environment. As illustrated, the user 310 of HMD 200 is looking "down the line" or "dead center" of the VR environment 320, the center of which is reflected by ray 330. It should be noted that ray 330 is presented solely for the purpose of assisting with illustration and is not literally present in the VR environment 320 although it is possible that indicia of orientation could be displayed by the HMD 200 with respect to the virtual environment 320. As reflected by ray 330 and the line-of-sight of the user (340), both may be relatively parallel to one another.

Ray 330, while not a necessary illustrated element in the VR environment, may be determined from calibrating the HMD 200 when the user 310 first mounts the same to their head. By utilizing information generated by one or more of three-dimensional axis gyroscopes 140, accelerometers 150, and magnetometers 160, the wearable virtual reality system 100 may calculate a "start" or "neutral" position of the user and the VR environment from which further motion of the head of the user 310—and by extension the HMD 200—are adjudged. Such calibration may occur at the beginning of operation, during a manual reset, or in response to an automatic determination by the wearable virtual reality system 100 that positional information has "drifted" or is no longer correlating properly such that re-calibration is required. Such determination may occur through execution of software stored in memory 170 by processor 180.

Turning now to user 350 in FIG. 3, such user (which is the same user as user 310 but simply having turned their head approximately 45 degrees) has turned their head such that their line-of-sight is no longer parallel along ray 330 as established during the aforementioned calibration process. The new line-of-sight $340_1$ reflects that the line-of-sight is now approximately 45 degrees (360) to the right of the originally established ray 330. By utilizing information generated by one or more of three-dimensional axis gyroscopes 140, accelerometers 150, and magnetometers 160, the wearable virtual reality system 100 may calculate how far the line-of-sight $340_1$ has changed from 'start' or 'neutral' position of the user and that was used to establish ray 330.

Like ray 330, angle 360 is illustrated for assisting in the understanding of the implementation of an environmental interrupt or "pause" feature whereby activities in the environment are interrupted or put on hold to allow for some other function, including but not limited to menu navigation. But also like ray 330, angle 360 may be visually illustrated to the user in the virtual environment 320 as part of a graphical overlay. This information might be displayed as a geometric illustration showing the actual change in angle from center ray 330 or merely as a numerical indicator of the number of degrees (e.g., 12 degrees) of center 330 that the user has turned their head.

It should be noted that while an embodiment of the present invention specifically addresses an "interrupt" or "pause" functionality by way of the user turning their head in excess of a particular angle as illustrated in FIG. 3, other functionalities may be associated with the positional change (e.g., save function, reset function, re-start function). In this regard, the interrupt or "pause" function is exemplary. Still further, an embodiment might implement different angles with different functions. For example, "pause" might be implement after 20 degrees off of center 330, whereas save might be implemented after 30 degrees from center 330, and re-start after 45 degrees from center 330. Implementation of those functions may occur as soon as the degree change is reached or after the user leaves their head in a particular position change for a predetermined period of time.

Figure 4:
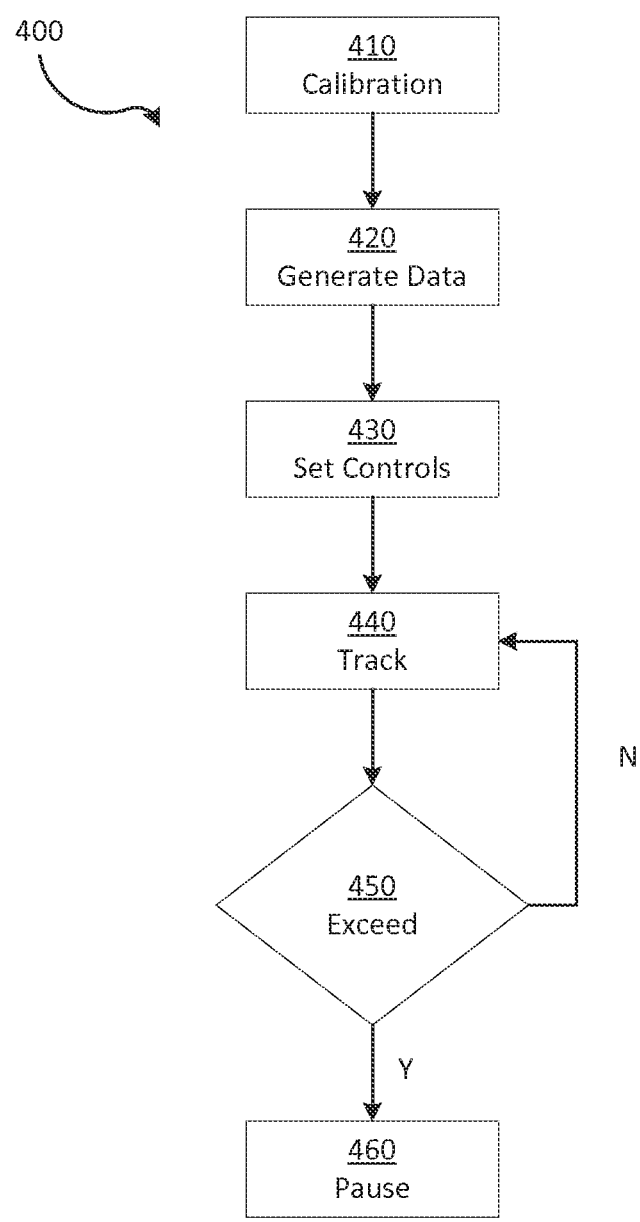
FIG. 4 illustrates a method for implementing an interrupt in the VR environment.

FIG. 4 illustrates a method 400 for implementing an interrupt in the VR environment. The method 400 of FIG. 4 may be embodied as executable instructions in a non-transitory computer readable storage medium including but not limited to a CD, DVD, or non-volatile memory such as a hard drive. Such methodology may be implemented by processor 180 executing non-transitory computer readable instructions embodied in memory 170. Processor 180 and software stored in memory 170 may utilize data acquired from various other components of system 100 including three-dimensional axis gyroscopes 140, accelerometers 150, and magnetometers 160. The steps identified in FIG. 4 (and the order thereof) are exemplary and may include various alternatives, equivalents, or derivations thereof including but not limited to the order of execution of the same.

In step 410, a calibration process may commence. The calibration may occur at start-up of wearable virtual reality system 100 or in response to launching a particular application in the context of system 100. A user may also request a manual calibration, or the system 100 may require one due to positional drifts.

In response to the calibration process, information from three-dimensional axis gyroscopes 140, accelerometers 150, and magnetometers 160 is received in step 420. This information will be used to determine a neutral or "at rest" position from which all other angular calculations will be contextually judged. This determination may correspond, for example, to ray 330 as discussed in the context of FIG. 3. Measurements and calculations may take place on the X as well as the Y axis. In this regard, "pause" or other functions may be introduced not only by movements along the X-axis, but also along the Y-axis or even a combination of the two (e.g., a user raises their head to the right and beyond a certain position).

In step 430, various controls may be set with respect to positional data generated in step 420. The neutral position of ray 330 may be confirmed as well as various functions that may be implemented if the positional data of HMD 200 indicates that the user has turned their line-of-sight beyond a particular angle, which may include along a particular axis or axes. In some instances, various functions may be implemented for increasing angles of change. Time periods may also be implemented whereby a user must change their line-of-sight along a particular axis beyond a particular angle for a given period of time.

In step 440, tracking of HMD 200 commences using information generated by the likes of three-dimensional axis gyroscopes 140, accelerometers 150, and magnetometers 160. Throughout the tracking process, a continual check is made as to whether the position data of HMD 200 indicates that it has exceeded one of the limitations or controls set in step 430. For example, and as shown in FIG. 3, a determination is made as to whether the user has moved their head and hence their line-of-sight 340 beyond a particular control angle relative neutral ray 330. If the angle has not been exceeded (or not exceeded for a predefined period of time), then tracking continues at step 440, and checks relative to settings from step 430 continue to be made at step 450. If the user has, however, exceeded a positional setting along a particular axis for a particular period of time (or any other setting controlled at step 430), then the corresponding functionality—such as a "pause"—may be implemented at step 460.

FIG. 5 illustrates the use of non-field-of-view real estate to provide information ancillary to the VR environment. A user may be determined to have turned their field of view beyond a neutral or center setting, such as discussed in the context of FIG. 3. Because the user has paused the VR environment being displayed by HMD 200, the user may now attend to other activities in the real-estate areas that are not a direct part of VR environment and that would typically be relegated to the "peripheral vision" areas of the line-of-sight of the user.

For example, this area might include various menus and controls related to the VR environment or the application currently executing to generate the VR environment. It may further include data about the VR environment such as status of activity taking place in the environment (e.g., scores, health, inventory, etc.). The peripheral area real estate might also include status information concerning the system 100 or the HMD 200 of the system 100. Advertisements might also be displayed in this area. Other applications might also execute in this area, such as video calls, messages, or other real-time communications. By using this space for such data and allowing the user to access the same during a paused state, the primary line-of-sight area in the VR environment can be better utilized.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for executing a plurality of different functions within a virtual environment, the method comprising:
    storing control settings in memory that associate a plurality of different functionalities with different corresponding changes in angle for a position of a head-mounted display (HMD) measured from a calibrated neutral position;
    calibrating the neutral position for the HMD, wherein the calibration is performed using one or more sensors;
    measuring positional data associated with the HMD via the one or more sensors, wherein the measured positional data indicates a change in angle from the calibrated neutral position to a current position of the HMD;
    matching the change in angle indicated by the positional data of the HMD with a corresponding change in angle associated with one of the control settings; and
    executing the corresponding function associated with the matched change in angle after the HMD remains at the current position for a predetermined period of time.

2. The method of claim 1, further comprising interrupting a display of a virtual environment in the HMD while the corresponding function is being executed.

3. The method of claim 1, further comprising displaying the measured positional data on the HMD.

4. The method of claim 3, wherein the displayed positional data includes the line of sight of the user.

5. The method of claim 3, wherein the displayed positional data includes a ray that represents the neutral position of the HMD.

6. The method of claim 3, wherein the displayed positional data includes an indication of a difference between the neutral position of the HMD and the current line of sight of the user.

7. The method of claim 6, wherein the indication of the difference is illustrated via a geometric illustration.

8. The method of claim 6, wherein the indication of the difference is illustrated as a numerical indicator.

9. The method of claim 1, wherein the one or more sensors include gyroscopes.

10. The method of claim 1, wherein the one or more sensors include accelerometers.

11. The method of claim 1, wherein the one or more sensor include magnetometers.

12. The method of claim 1, wherein the executed corresponding function includes a save function.

13. The method of claim 1, wherein the executed corresponding function includes a reset function.

14. The method of claim 1, wherein the executed corresponding function includes a restart function.

15. The method of claim 1, wherein the predetermined period of time is set so that the corresponding function is executed as soon as the position data matches the change in position associated with the control setting.

16. The method of claim 1, wherein the corresponding function is executed after the measured position data changes after the HMD remains at the current position for the predetermined period of time.

17. The method of claim 1, wherein the measured positional data indicates change along the x-axis or the y-axis.

18. The method of claim 1, wherein the measured positional data indicates change along both the x- and y axis.

19. A non-transitory computer-readable storage medium having embodied thereon a program, the program being executable by a processor to perform a method for executing a plurality of different functions within a virtual environment, the method comprising:
 storing control settings in memory that associate a plurality of different functionalities with different corresponding changes in angle for a position of a head-mounted display (HMD) measured from a calibrated neutral position;
 calibrating a neutral position for the HMD, wherein the calibration is performed using one or more sensors;
 measuring positional data associated with the HMD via the one or more sensors, wherein the measured positional data indicates a change in angle from the calibrated neutral position to a current position of the HMD;
 matching the change in angle indicated by the positional data of the HMD with a corresponding change in angle associated with the control settings; and
 executing the corresponding function associated with the matched change in angle after the HMD remains at the current position for a predetermined period of time.

* * * * *